United States Patent
Miyaji et al.

[11] Patent Number: 5,153,470
[45] Date of Patent: Oct. 6, 1992

[54] SPINDLE MOTOR

[75] Inventors: Itsuo Miyaji, Yokaichi; Takeshi Uda, Kyoto; Hiroyuki Yonei, Hikone, all of Japan

[73] Assignee: Nippon Densan Corporation, Kyoto, Japan

[21] Appl. No.: 805,468

[22] Filed: Dec. 10, 1991

Related U.S. Application Data

[62] Division of Ser. No. 706,294, May 28, 1991, Pat. No. 5,134,331.

Foreign Application Priority Data

May 31, 1990 [JP] Japan ............... 2-143385
Jun. 29, 1990 [JP] Japan ............... 2-173965
Jul. 27, 1990 [JP] Japan ............... 2-200617

[51] Int. Cl.⁵ .............................. H02K 7/14
[52] U.S. Cl. .................... 310/67 R; 310/88
[58] Field of Search ............. 310/67 R, 71, 268, 88; 360/98.07, 98.08, 99.04, 99.05, 99.08, 99.12

[56] References Cited

U.S. PATENT DOCUMENTS

| | | | |
|---|---|---|---|
| 3,310,698 | 3/1967 | Krell | 310/71 |
| 3,700,358 | 10/1972 | Papst et al. | 310/67 R |
| 3,777,191 | 12/1973 | Papst et al. | 310/67 R |
| 4,588,912 | 5/1986 | Shinmura et al. | 310/71 |
| 4,616,149 | 10/1986 | Best | 310/71 |
| 4,636,669 | 1/1987 | Plunkett et al. | 310/67 R |
| 4,773,828 | 9/1988 | Hagiwara et al. | 310/71 |

Primary Examiner—Steven L. Stephan
Assistant Examiner—Clayton E. LaBalle
Attorney, Agent, or Firm—McCormick, Paulding & Huber

[57] ABSTRACT

A spindle motor includes a bracket, a shaft member fixed to the bracket, a hub member rotatably mounted on the shaft member with a bearing member therebetween, a rotor magnet mounted on the hub member, a stator disposed in opposed relation to the rotor magnet, and a magnetic fluid sealing assembly disposed on on outer side of the bearings. The shaft member has an elastic sealing member which seals a through-hole formed in the shaft.

4 Claims, 6 Drawing Sheets

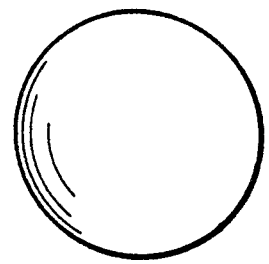
FIG. 9
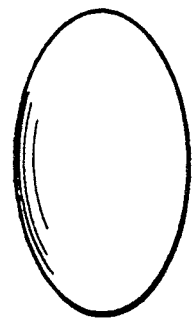       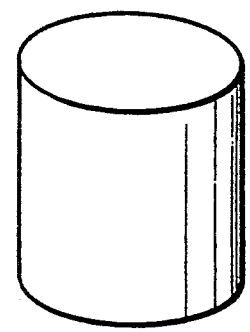
FIG. 10-A       FIG. 10-B

SPINDLE MOTOR

This is a divisional of co-pending application Ser. No. 07/706,294, filed on May 28, 1991, now U.S. Pat. No. 5,134,331.

BACKGROUND OF THE INVENTION

1. Field of the Invention

The present invention relates to a spindle motor for rotating a recording disk such as a magnetic disk.

2. Description of the Related Art

In general, a spindle motor includes a shaft member, a hub member rotatably mounted on the shaft member with a bearing member therebetween, a rotor magnet mounted on the hub member, and a stator disposed in opposed relation to the rotor magnet. A recording disk is mounted on the hub member in a predetermined manner. A magnetic fluid sealing means is provided on an outer side of the bearing means in order to prevent impurities, such as grease for the bearing member, from entering a disk chamber. The magnetic fluid sealing means includes a magnetic fluid for forming a sealing layer, and a magnetic fluid retaining means for magnetically retaining the magnetic fluid.

In the above-described type of spindle motor, a magnetic flux from the magnetic fluid retaining means leaks, and adversely affects a recording member mounted on the hub member and/or a head means for reading (and/or writing) information. Such leaking magnetic flux has become a subject of attention as the information recording density increases.

In the spindle motor of the above-described type, a flexible substrate is generally used for supplying a driving current to a coil of the stator in a predetermined manner. That is, the coil is electrically connected to a terminal portion provided on one end portion of the flexible substrate, and a connector member provided on the other end portion of the flexible substrate is electrically connected to a connector means of a driving device. Consequently, electrical connection of the flexible substrate is completed, and the size of the motor is increased.

Furthermore, in the aforementioned type of spindle motor, an internally threaded hole is formed in the shaft member, and a clamp member for mounting a recording disk is mounted by bringing an attaching screw into engagement with this internally threaded hole. However, the internally threaded hole extends only halfway through the shaft member. Therefore, when the shaft member (or both the hub member and the shaft member when the shaft member is formed integrally with the hub member) is surface processed, a surface processing liquid may not enter the distal end portion of the internally threaded hole, leaving the distal end of the internally threaded hole in a non-processed state.

SUMMARY OF THE INVENTION

A primary object of the present invention is to provide a spindle motor which is capable of suppressing a magnetic flux leaking from a magnetic fluid retaining means and thereby reducing adverse effect of the leaking magnetic flux.

A second object of the present invention is to provide a spindle motor which enables assembly of the motor and mounting of the motor on a driving device to be facilitated, and which enables the overall size of the motor to be reduced.

A third object of the present invention is to provide a spindle motor which enables an internally threaded hole formed in a shaft member to be surface processed deep inside thereof, and which is capable of maintaining cleanness of a disk chamber.

Other objects and features of the present invention will become clear from the following description taken in connection with the accompanying drawings.

BRIEF DESCRIPTION OF THE DRAWINGS

FIG. 9 is an enlarged perspective view of an elastic member in the spindle motor of FIG. 6; and FIGS. 10-A and 10-B are respectively perspective views showing modifications of the elastic member.

DETAILED DESCRIPTION OF THE PREFERRED EMBODIMENTS

Embodiments of the present invention will now be described in detail with reference to the accompanying drawings.

First, a first embodiment of a spindle motor according to the present invention will be described with reference to FIGS. 1 and 2.

Figure 1:
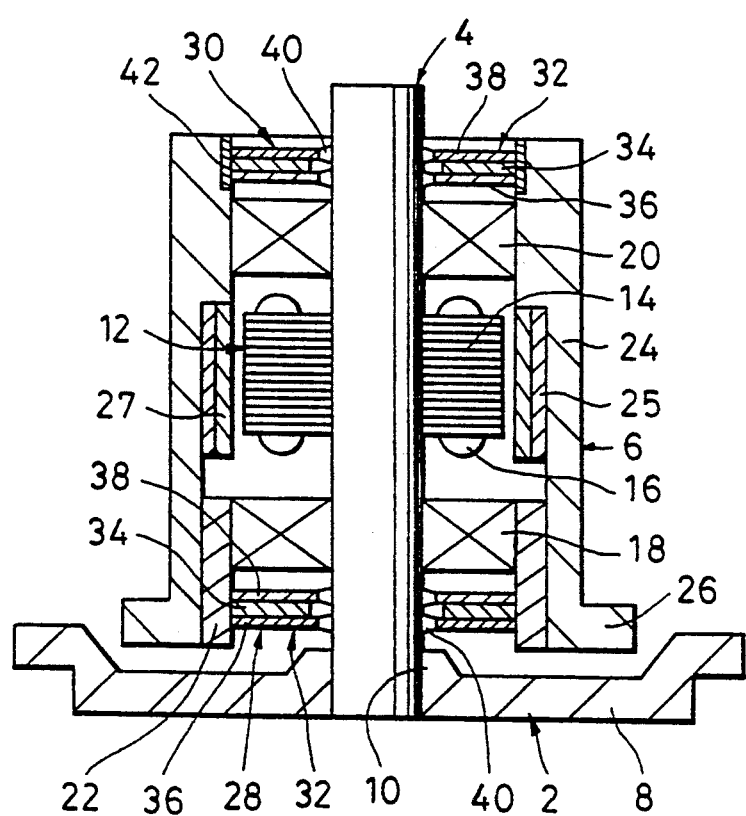
FIG. 1 is a cross-sectional view of a first embodiment of a spindle motor according to the present invention.

Referring first to FIG. 1, a spindle motor comprises a bracket 2, a shaft member 4 fixed to the bracket 2, and a hub member 6 which is relatively rotatable with respect to the shaft member 4. The bracket 2 has a substantially disk-shaped bracket body 8 having an upward-projecting boss portion 10 at its central portion. The bracket 2 is fixed to a frame (not shown) of a driving unit.

One end portion (a lower end portion) of the shaft member 4 is fixed to the boss portion 10 of the bracket 2 by means of, for example, press fitting. The shaft member 4 projects from the bracket 2 in a substantially upward direction. The shaft member 4 may be formed integrally with the bracket 2. Practically, the bracket 2 is formed of aluminum or an aluminum alloy while the shaft member 4 is formed of a magnetic material, such as iron.

A stator 12 is mounted on the intermediate portion of the shaft member 4. The stator 12 has a stator core 14 formed by piling a plurality of core plates on top of another, and a coil 16 wound around the stator core 14 a predetermined number of times. Bearing members 18 and 20 are provided on the two end portions (the portions located on the outer side of the portion on which the stator 12 is mounted) of the shaft member 4 so as to rotatably support the hub member 6 therethrough relative to the shaft member 4. Practically, one end portion (a lower end portion) of the hub member 6 is supported on the bearing member 18 with an annular bush member 22 formed of a magnetic material, such as iron, therebetween, and the other end portion (an upper end portion) of the hub member 6 is directly supported on the bearing member 20.

The hub member 6 has a cylindrical hub body 24. One end portion of the hub body 24 made of aluminum or an aluminum alloy projects outward in the radial direction to form a flange portion 26. A plurality of recording members (not shown), such as magnetic disks, are mounted between that flange portion 26 and a clamp member (not shown) mounted on the other end portion of the hub member 24 with an annular spacer (not shown) therebetween. A yoke member 25 formed of a magnetic material is provided on the inner peripheral surface of the intermediate portion of the hub body 24, and a rotor magnet 27 is mounted on the inner peripheral surface of the yoke member 25.

Magnetic fluid sealing means 28 and 30 are respectively provided on the outer side of the bearing members 18 and 20. The magnetic fluid sealing means 28 and 30 have substantially the same structure. Therefore, the magnetic fluid sealing means 28 disposed on the outer side of the bearing member 18 (disposed between the bearing member 18 and the bracket 2) will be described.

Figure 2:
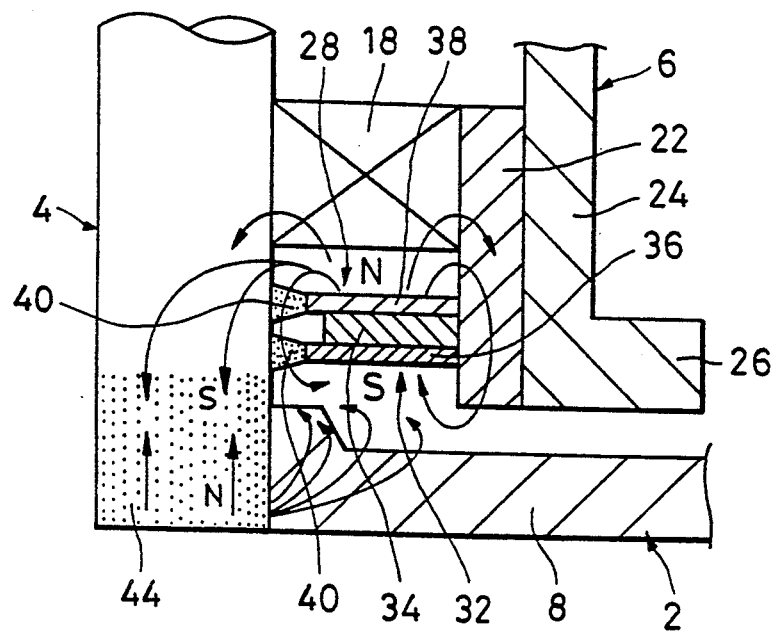
FIG. 2 is an enlarged cross-sectional view of the essential parts of the spindle motor of FIG. 1.

Referring to both FIGS. 1 and 2, the magnetic fluid sealing means 28 (30) has a magnetic fluid retaining means 32 which is mounted on the inner peripheral surface of the end portion of the bush member 22. The magnetic fluid retaining means 32 has an annular permanent magnet 34, and a pair of pole pieces 36 and 38 disposed on the two end surfaces of the annular permanent magnet 34. The inner peripheral edge portion of each of the pole pieces 36 and 38 extends further inwardly than the inner peripheral edge of the permanent magnet 34, and is located adjacent to the outer peripheral surface of the shaft member 4. A magnetic fluid 40 is filled and retained between each of the pole pieces 36 and 38 and the shaft member 4 so as to form a sealing layer. As shown in FIG. 1, in the other magnetic fluid sealing means 30, the magnetic fluid retaining means 32 is mounted on the inner peripheral surface of the other end portion of the hub member 6 with an annular ring 42 formed of a magnetic material therebetween.

Practically, the annular permanent magnet 34 of the magnetic fluid sealing means 28 (30) is magnetized in an axial direction (in the vertical direction as viewed in FIGS. 1 and 2): the outer end surface portion thereof (the lower end surface portion as viewed in FIGS. 1 and 2 or the upper end surface portion of the other magnetic fluid sealing means 30) is magnetized to the S pole, and the inner end surface portion thereof (the upper end surface portion as viewed in FIGS. 1 and 2 or the lower end surface portion of the other magnetic fluid sealing means 30) is magnetized to the N pole. Regarding this, in the outer pole piece 36, the inner end surface portion thereof which is in contact with the permanent magnet 34 is magnetized to the N pole, while the outer end surface portion thereof is magnetized to the S pole, as shown in FIG. 2. Also, in the inner pole piece 38, the outer end surface portion thereof which is in contact with the permanent magnet 34 is magnetized to the S pole, and the inner end surface portion thereof is magnetized to the N hole, as shown in FIG. 2.

Practically, a magnetized portion 44 is provided on one end portion (lower end portion) of the shaft member 4 so as to suppress the magnetic flux leaking from the magnetic fluid retaining means 32 of the magnetic fluid sealing means 28. The magnetized portion 44 may be formed by bringing a magnetizing portion (not shown) of a magnetizing device into contact with or locating it adjacent to one end portion of the shaft member 4. When the outer end surface portion of the outer pole piece 36 is magnetized to the S pole, as shown in FIGS. 1 and 2, the one end portion of the shaft member 4 is magnetized to the N pole. In this way, the inner portion of the one end portion of the shaft member 4, i.e., the inner portion located adjacent to the outer pole piece 36, is magnetized to the S pole, as shown in FIG. 2, and a magnetic flux is generated from the magnetized portion 44 of the shaft member 4 and magnetic fluid retaining means 32 in the manner indicated by the solid lines in FIG. 2. Consequently, the magnetic flux leaking from the magnetic fluid retaining means 32 is suppressed by the magnetized portion 44 of the shaft member 4 (part of the magnetic flux leaking from the retaining means 32 is blocked by the brush member 22), and the magnetic flux leaking outwardly from the hub member 6 is thereby reduced. The magnetized portion 44 is magnetized to, for example, 30 to 70 Gauss. When it is magnetized strongly, the magnetic flux leaking from that magnetized portion 44 causes a problem. A weakly magnetized portion 44 may not be able to suppress the leaking magnetic flux effectively.

In a case where the permanent magnet 34 of the magnetic fluid retaining means 32 is disposed reversely, i.e., where the outer end surface portion of the permanent magnet 34 is magnetized to the N pole and the inner end surface portion thereof is magnetized to the S pole, the one end portion of the shaft member 4 is magnetized to the S pole which is the opposite pole to that of the aforementioned case.

The leaking magnetic flux of the spindle motor having the configuration shown in FIGS. 1 and 2 was measured. The annular permanent magnet 34 of the magnetic fluid sealing means 32 was magnetized to 300 Gauss, and the one end portion of the shaft member 4 was magnetized to 50 Gauss. The leaking magnetic flux measured at a specific position separated from the central axis of the shaft member 4 outwardly in the radial direction by 20 mm and located in the vicinity of the upper surface of the flange portion 26 of the hub member 6 was 1.5 Gauss. In a spindle motor having the same structure as that of the aforementioned one with the exception that the shaft member 4 has no magnetized portion 44, the leaking magnetic flux measured at the same specific position was 3.5 Gauss. It is clear from the results of the measurements that provision of the magnetized portion 44 on the shaft member 4 greatly reduces the leaking magnetic flux from the magnetic fluid retaining means 32, and thus eliminates adverse effect of this leaking magnetic flux on the spindle motor mounted on the driving device.

When the leaking magnetic flux from the magnetic fluid retaining means 32 of the other magnetic fluid sealing means 30 should be reduced, a magnetized portion is also provided on the other end portion of the shaft member 4 (the other end portion thereof is magnetized in the same manner).

Figure 3:
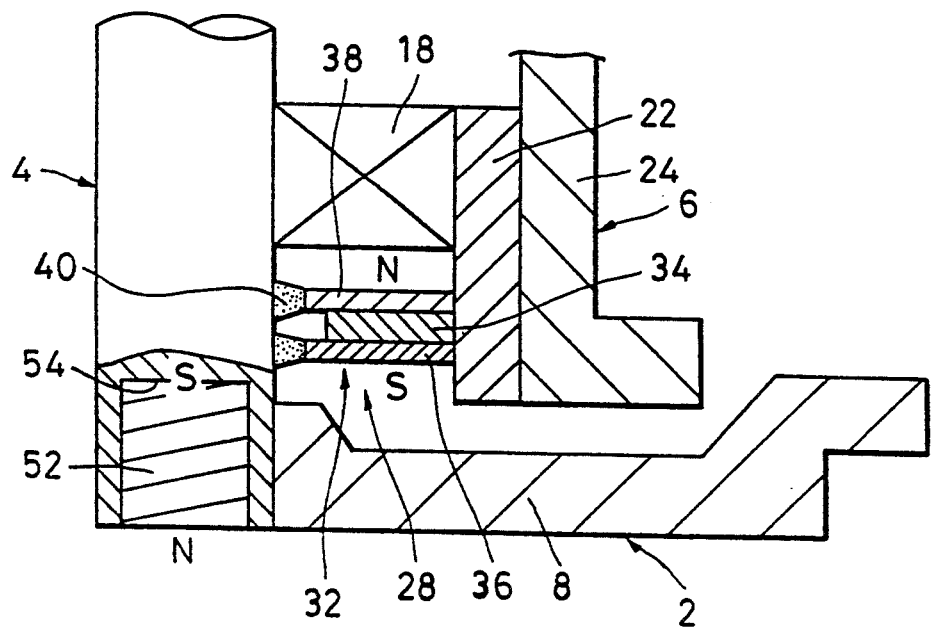
FIG. 3 is an enlarged cross-sectional view of the essential parts of a second embodiment of the spindle motor according to the present invention.

FIG. 3 shows in an enlarged fashion the essential parts of a second embodiment of a spindle motor according to the present invention. In this second and following third embodiments, the same reference numerals are used to denote components which are the same as those in the first embodiment.

In the second embodiment shown in FIG. 3, one end portion of the shaft member 4 is not magnetized but a permanent magnet 52 (which constitutes the magnetized portion) is embedded in one end portion of the shaft member 4. A cylindrical recessed portion 54 is formed in one end portion of the shaft member 4. The recessed portion 54 is open to the end surface of the shaft member 4. The recessed portion 54 may be extended to the vicinity of the outer pole piece 36 of the magnetic fluid retaining means 32. The cylindrical permanent magnet 52 is fitted into the recessed portion 54.

As in the case of the first embodiment, the permanent magnet 34 of the magnetic fluid sealing means 28 is magnetized in the axial direction (in the vertical direction): the outer end surface portion thereof is magnetized to the S pole and the inner end surface portion thereof is magnetized to the N pole. With respect to this, the outer end surface portion of the outer pole piece 36 is magnetized to the S pole, and the inner end surface portion of the inner pole piece 38 is magnetized to the N pole. The permanent magnet 52 is fitted into the recessed portion 54 of the shaft member 4 such that the S pole thereof is located adjacent to the magnetic fluid retaining means 32 and that the N pole thereof is located adjacent to the one end portion of the shaft member 4. Other structures of the second embodiment are the same as those of the first embodiment, description thereof being omitted.

In the second embodiment, the magnetic flux leaking from the magnetic fluid retaining means 32 is suppressed by the permanent magnet 52 embedded in the shaft member 4, and the magnetic flux leaking from the hub member 6 is thus reduced.

Figure 4:
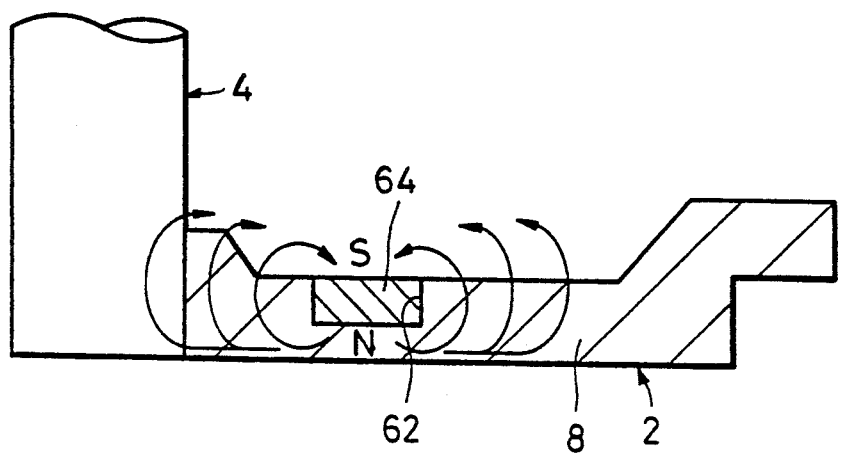
FIG. 4 is an enlarged cross-sectional view of the essential parts of a third embodiment of the spindle motor according to the present invention.
Figure 5:
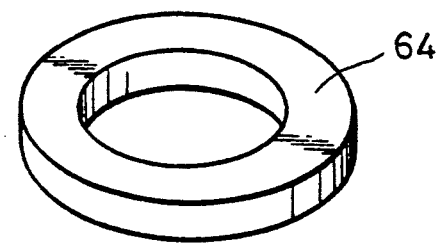
FIG. 5 is a perspective view of a permanent magnet in the spindle motor of FIG. 4.

FIGS. 4 and 5 show in an enlarged fashion the essential parts of a third embodiment of the spindle motor according to the present invention.

In the third embodiment shown in FIG. 4, a magnetized portion is provided in the bracket 2 in place of in the shaft member 4. An annular recessed portion 62 is formed in the bracket body 8 of the bracket 2, and an annular permanent magnet 64 (see FIG. 5 also) is fitted into the annular recessed portion 62. The permanent magnet 64 is preferably disposed in opposed relation to the magnetic fluid retaining means of one of the magnetic fluid sealing means.

In this third embodiment, a similar magnetic fluid sealing means (not shown in FIG. 4) to that of the first embodiment is provided. With respect to this, the permanent magnet 64 is fitted into the recessed portion 62 such that one end surface portion opposed to the magnetic flux retaining means (the upper end surface portion as viewed in FIG. 4) has the S pole and that the other end surface portion thereof (the lower end surface portion as viewed in FIG. 4) has the N pole. In that case, the bracket 2 is preferably made of a magnetic material, such as iron. The other structures of the third embodiment are the same as those of the first embodiment, although they are not shown in FIGS. 4 and 5, description thereof being omitted.

In the third embodiment, the permanent magnet 64 embedded in the bracket 2 generates a magnetic flux indicated by the solid lines in FIG. 4. This magnetic flux from the permanent magnet 64 suppresses the magnetic flux leaking from the magnetic fluid retaining means and hence reduces the magnetic flux leaking from the hub member 4, as in the case of the first embodiment.

In the first to third embodiments, the magnetic fluid retaining means includes the permanent magnet 34 and the pair of pole pieces 36 and 39. However, the structure of the magnetic fluid retaining means is not limited to this but it may also be constructed by a permanent magnet and a single pole piece. Alternatively, the magnetic fluid retaining means may be constructed by a permanent magnet alone. In either case, it is possible to reduce the leaking magnetic flux by providing the aforementioned magnetized portion.

Furthermore, although the permanent magnet 64 is provided in the bracket 2 in the third embodiment, a particular portion of the bracket 2 may be magnetized, as in the case of the first embodiment. In that case, a magnetizing portion of the magnetizing device may be located near or brought into contact with the outer surface of the bracket 2 after assembly of the motor so as to magnetize that outer portion to a polarity opposed to that of the outer end surface portion of the permanent magnet of the magnetic fluid retaining means. Alternatively, a magnetic plate may be provided on the inner surface of the bracket 2 made of a non-magnetic material, that magnetic plate being magnetized.

FIGS. 6 to 9 show a fourth embodiment of the spindle motor according to the present invention.

Figure 6:
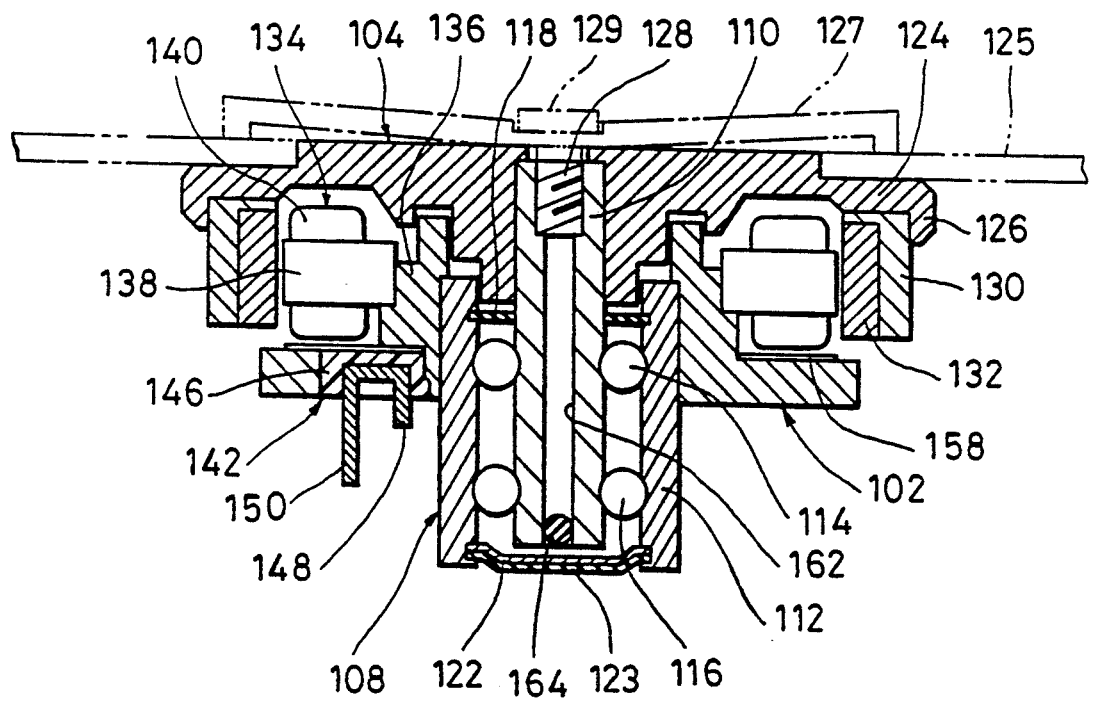
FIG. 6 is a cross-sectional view of a fourth embodiment of the spindle motor according to the present invention.
Figure 8:
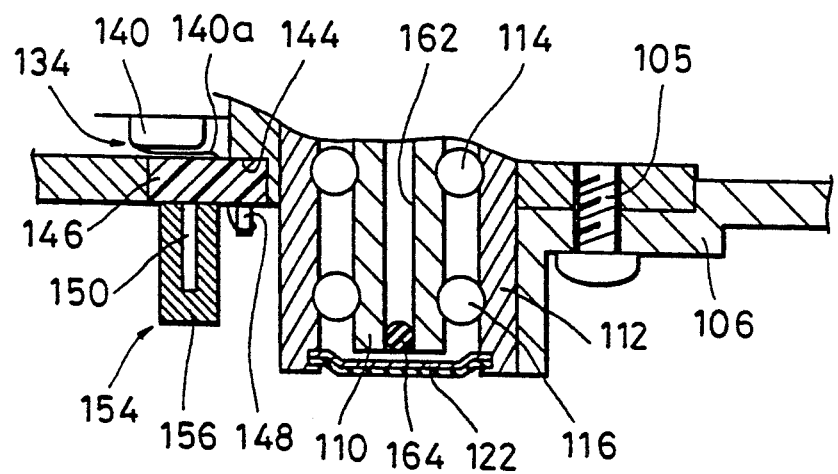
FIG. 8 is an enlarged cross-sectional view of the lower portion of the spindle motor of FIG. 6.

In FIG. 6, a spindle motor includes a substantially cylindrical bracket 102, and a hub member 104 which is relatively rotatable with respect to the bracket 102. The bracket 102 is mounted on a frame 106 (part thereof being shown in FIG. 8) of a driving device by means of, for example, a fixing screw 105 (FIG. 8). The hub member 104 is rotatably supported on the bracket 102 through a bearing means 108. The bearing means 108, which is a so-called unit type bearing member, includes a shaft member 110 (which functions as the shaft member for supporting the hub member 104), an outer sleeve member 112 disposed on the outer side of the shaft member, and a plurality of spherical members 114 and 116 disposed between the shaft member 110 and the outer sleeve member 112. One end portion (upper end portion) of the outer sleeve member 112 is fixed substantially to the central portion of the bracket 102, and the other end portion (lower end portion) thereof projects outward from the bracket 102. The plurality of spherical members 114 are disposed on one end portion of the outer sleeve member 112, and a sealing member 118 formed of a rubber material is disposed on the outer side of the spherical members 114 (above the spherical member 114 as viewed in FIG. 6). Also, the plurality of spherical members 116 are disposed on the other end portion of the outer sleeve member 112, and a cap member 122 formed of a metal material (which may be coated with a rubber material 123) is disposed on the outer side of the spherical members 116 (below the spherical members 116 as viewed in FIG. 6).

One end portion of the shaft member 110 passes the outer sleeve member 112 and projects outward. The hub member 104 is fixed to the projecting end portion of the shaft member 110. The hub member 104 has on its outer periphery a flange portion 124 which projects outwardly in the radial direction. The flange portion 124 is formed integrally with the hub member 104. The flange portion 124 has a hanging portion 126 which hangs downwardly. The hanging portion 126 is formed integrally with the flange portion 124. A recording member 125, such as a magnetic disk, is fixed to the flange portion 124 by means of a clamp member 127. The shaft member 110 has an internally threaded hole 128 into which a fixing screw 129 is screwed so as to fix the clamp member 127. The internally threaded hole 128 and the structure related to this will be described later in detail.

An annular yoke member 130 is mounted on the inner peripheral surface of the hanging portion 126 of the hub member 104, and an annular rotor magnet 132 is mounted on the inner peripheral surface of the yoke member 130. Also, a stator 134 is disposed in opposed relation to the rotor magnet 132. The stator 134 has a stator core 138 which is fixed to the outer peripheral surface of an annular projection 136 of the bracket 102 and around which a coil 140 is wound a predetermined number of times.

Figure 7:
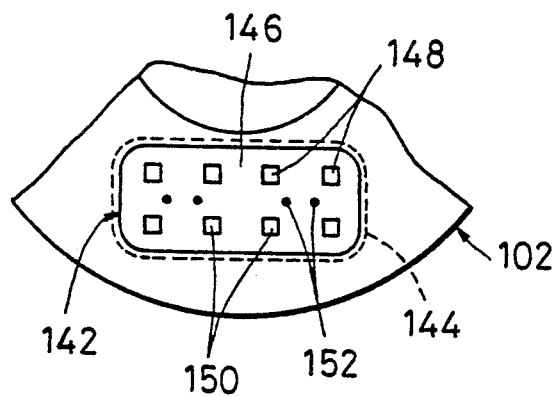
FIG. 7 is an enlarged view of a connector means and the vicinity thereof of the spindle motor of FIG. 6.

In the thus-arranged spindle motor, a lead 140a (FIG. 8) of the coil 140 is connected to a connector means 142 in the manner described below. Referring to FIGS. 6 to 8, a rectangular recessed portion 144, which is open to the inner side of the bracket 102, is formed at a predetermined position of the bracket 102, and the connector means 142 is fitted in the recessed portion 144. The connector 142 has a rectangular connector body 146 made of, for example, a synthetic resin. Four first terminals 148 and four second terminals 150 are provided on the connector body 146. The first terminals 148 are shorter than the second terminals 150. The first terminals 148 are connected to the corresponding second terminals 150 within the connector body 146 (see FIG. 6). Also, four small through-holes 152 are formed in the connector body 146 (the portion thereof located between the first and second terminals 148 and 150). The left portion of the connector body 146 as viewed in FIG. 6, including that portion, is exposed on the inner side of the bracket 102. Four leads 140a led from the coil 140 of the stator 134 pass through the through-holes 152 and are electrically connected to the corresponding first terminals 148 by means of, for example, soldering.

A connector means 154 (FIG. 8) of the driving device is connected to the connector means 142. That is, the connector means 154 has a connector body 156 made of, for example, a synthetic resin. The connector body 156 has four receiving terminals which respectively correspond to the second terminals 150. The second terminals 150 of the connector means 142 are electrically connected to the receiving terminals. This electrical connection is achieved by mounting the motor on the frame 106 of the driving device. The connector 154 is electrically connected to a circuit means (not shown) of the driving device. Practically, a thin sealing member 158 (not shown in FIG. 8) made of a synthetic resin is adhered to the inner surface of the bracket 102 so as to reliably seal the interior of the bracket 102.

In the above-described spindle motor, the connector means 142 is directly fixed to the bracket 102 and this provides the following advantages.

First, the leads 140a of the coil 140 can be extended outward past the through-holes 152 in the connector body 146. This facilitates extension of the coil 140. Secondly, the structure related to the connector means 142 is simplified, and the assembly and mounting of the motor on the driving device are facilitated. Thirdly, since the first and second terminals 148 and 150 of the connector means 142 are protruded outward from the bracket 102, the height of the motor, particularly, the distance between the undersurface of the bracket 102 and the upper surface of the hub member 104, can be effectively reduced, thus reducing the height of the driving device.

Next, the internally threaded hole 128 and the structure related to this hole will be described. A through-hole 162 formed in the shaft member 110 extends along the axis thereof from one end to the other end thereof. The internally threaded hole 128 is formed at one end portion of the through-hole 162. Since the shaft member 110 has the through-hole 162, a processing liquid enters the through-hole 162, particularly, the internally threaded hole 128, and the shaft member 110 can be surface processed without leaving any non-processed portion.

As can be seen from FIG. 6, formation of the through-hole 162 causes the space where the spherical members 114 and 116 are accommodated (the space between the shaft member 110 and the outer sleeve member 112) and an accommodating chamber (the space where the recording member 125 is accommodated) to communicate with each other. In that case, a lubricant grease may enter the accommodating chamber past the through-hole 162. To prevent entering of the grease, an elastic member 164 is inserted in the other end portion of the through-hole 162 so as to seal the through-hole 162. The elastic member 164 may be press fitted in the through-hole 162 after the spherical members 114 and 116 are mounted between the shaft member 110 and the outer sleeve member 112 to assembly the bearing unit. Therefore, no special tool is required to mount the elastic member 164.

The elastic member 164 may be made of a synthetic rubber, such as nitrile rubber (NBR). Practically, the elastic member 164 has a spherical shape, and the outer diameter thereof is made slightly larger than the inner diameter of the through-hole 162. When press fitted in the through-hole 162, the elastic member 164 is elastically deformed in the axial direction to form a substantially elliptical shape and is closely fitted to the inner peripheral surface of the through-hole 162. In this state, the elastic member 164 keeps imparting a fixed amount of elastic force to the inner peripheral surface of the through-hole 162, and thus blocks communication between the accommodating chamber and the internal space of the bearing unit.

The elastic member 164 may also be made of other rubber materials, such as styrene butadiene rubber (SBR) or acrylic rubber (ACM). An elastic member made of any of these rubbers ensures high sealing characteristics and easy manufacture.

Practically, the elastic member 164 has a spherical shape, as shown in FIG. 9. Alternatively, the elastic member 164 may have an egg-like shape, as shown in FIG. 10-A, or a columnar shape, as shown in FIG. 10-B. The elastic member 164 can be formed into any shape as long as it can seal the through-hole 162. Alternatively, the elastic member 164 may be formed of a synthetic resin.

In the fourth embodiment shown in FIGS. 6 to 9, the hub member 104 is fixed to the shaft member 110 of the bearing unit. However, the present invention can also be applied to a spindle motor in which the shaft member is formed integrally with the hub member and in which the shaft member is rotatably supported through a commonly used bearing member. In that case, the shaft member and the hub member are surface processed concurrently.

While the preferred forms of the present invention have been described, it is to be understood that modifications will be apparent to those skilled in the art without departing from the scope of the following claims.

What is claimed is:

1. A spindle motor including a hub member on which a recording disk is mounted, a rotor magnet mounted on said hub member, and a stator disposed in opposed relation to said rotor magnet, the recording disk being fixed to said hub member by means of a clamp member, said spindle motor being rotated by a relative rotation between between said rotor magnet and said stator, the improvement being characterized in that a through-hole which passes said hub member in an axial direction is formed in a shaft portion of said hub member, in that an internally threaded portion is formed in said through-hole for threadedly engaging said clamp member, and in that an inner end portion of said through-hole is sealed by a sealing means.

2. The spindle motor according to claim 1, wherein said sealing means comprises an elastic member.

3. The spindle motor according to claim 2, wherein said elastic member is made of synthetic rubber.

4. The spindle motor according to claim 2, wherein said elastic member has a spherical form.

* * * * *